United States Patent
Kunstle et al.

[15] 3,696,147
[45] Oct. 3, 1972

[54] PROCESS FOR CONTINUOUSLY PRODUCING PURE SORBIC ACID

[72] Inventors: Gerhard Kunstle; Heinz Liberda, both of Burghausen upper Bavaria, Germany

[73] Assignee: Wacker-Chemie G.m.b.H., Munich, Bavaria, Germany

[22] Filed: June 17, 1970

[21] Appl. No.: 46,878

[30] Foreign Application Priority Data

June 20, 1969   Germany..........P 19 31 461.5

[52] U.S. Cl. ..............................................260/526 N
[51] Int. Cl. ..............................................C07c 51/42
[58] Field of Search..................................260/526 N

[56] References Cited

UNITED STATES PATENTS 3,510,514   5/1970   Bordenca ..................260/526

*Primary Examiner*—Vivian Garner
*Attorney*—Donald Malcolm

[57] ABSTRACT

Process for continuously producing pure sorbic acid from raw sorbic acid obtained by hydrolysis or thermal cracking of polyesters by crystallization from water, which comprises forming a saturated aqueous solution of raw sorbic acid at a temperature slightly below the boiling point of the water and with a short dwell time of the order of 2 to 5 minutes, separating the impurities from the dissolved sorbic acid by centrifuging at the same temperature, and crystallizing out the pure sorbic acid.

1 Claim, 1 Drawing Figure

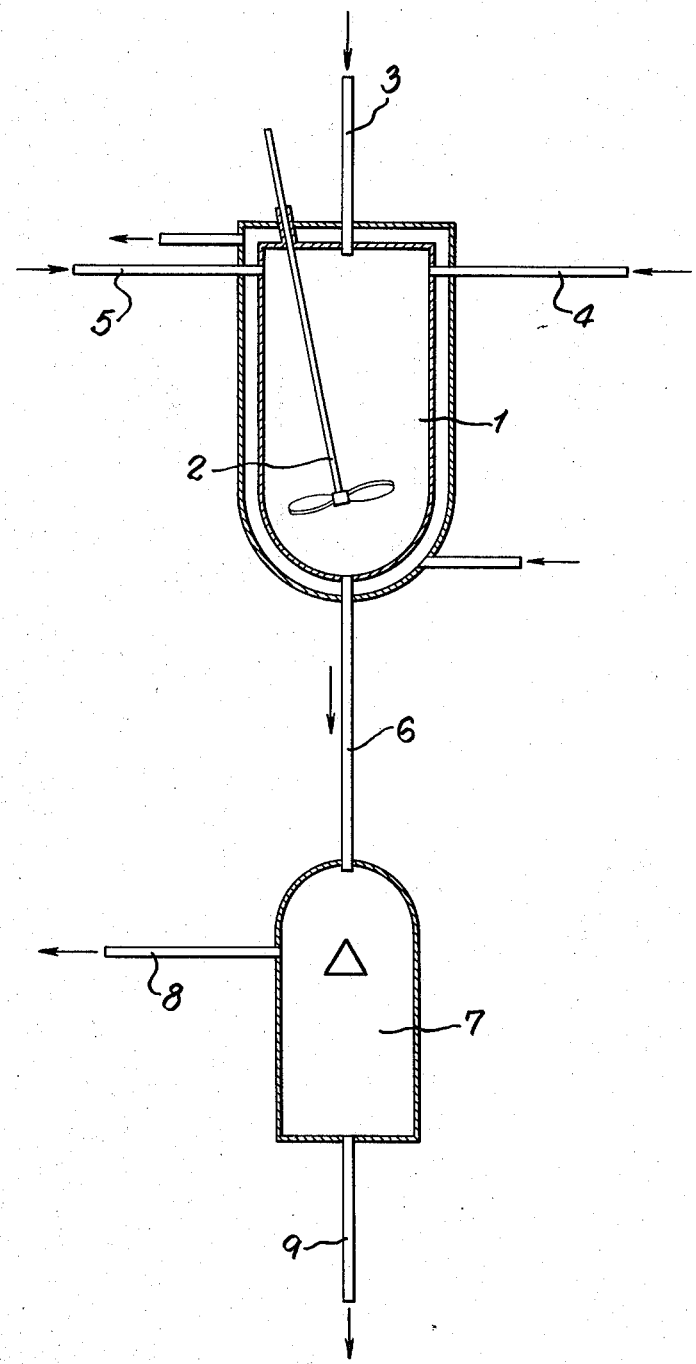

PROCESS FOR CONTINUOUSLY PRODUCING PURE SORBIC ACID

The polyester obtained by reacting ketene and crotonaldehyde in a known manner can be converted into sorbic acid in various ways, e.g. by hydrolysis or thermal cracking. In this manner, a polluted raw sorbic acid is always obtained whose by-products are formed during the conversion of ketene and during processing of the polyester.

It is also known that raw sorbic acid can be purified by known methods, for example by distilling, adsorption or crystallizing.

A disadvantage of purification by distilling lies in the necessary use of carrier substances, for example steam (see Japanese Pat. No. 478,361) or other reactioninert substances, e.g. hydrocarbons (see DAS Nos. 1,059,899 and 1,252,664). Since the evaporation heat of the carrier substance is necessarily lost, an additional consumption of energy arises in that case. Moreover, this method of purification requires extensive apparatus, particularly when subatmospheric pressure is used.

The removal of impurities by adsorption, for instance on diatomaceous earth is suitable and economical only when the raw sorbic acid already has a high degree of purity. However, this is not the case with the raw sorbic acid made in accordance with known methods.

Even by crystallization from organic solvents, for example ketones or alcohols, or from a mixture of solvent and water, it is very difficult to remove the partly high-molecular and partly low-molecular by-products from the raw sorbic acid. Moreover, the result is a sorbic acid which, with regard to color and stability, does not satisfy the high requirements of purity.

The disadvantages mentioned above do not occur during crystallization from water. However, the separation of the by-products that are not soluble in water causes difficulties, because the latter are either not retained by the filter or they quickly clog up the filter.

Attempts have already been made to remove the impurities by extraction with an electrolyte-containing water and to isolate the sorbic acid by crystallization from a solution thus prepurified - (see DAS No. 1,181,203). The purification effect gets lower as the throughput increases, so that only a low volume-time yield can be achieved. On the other hand, the necessary long period of contact between the impurities and the dissolved sorbic acid results in a dark coloring of the sorbic acid solution. Moreover, the periodic cleaning of the apparatus necessary in this method represents an additional drawback.

According to DDR patent specification No. 48,119 raw sorbic acid is purified by flotation. Because of the high volatility of the sorbic acid, losses of sorbic acid occur here as it is carried off. Additional measures are required to prevent this. Also, the oily or tarry, specifically lighter layer (foam) obtained by flotation includes, besides water vapor, air or inert gases, -sorbic acid solution whose recovery causes difficulties.

We have now discovered a process for the continuous production of pure sorbic acid from raw sorbic acid obtained by hydrolysis or thermal cracking of polyesters by crystallization from water. The process is characterized by the fact that we make a saturated aqueous solution of the raw sorbic acid at a temperature slightly below the boiling point of the water and with a short staying time, from this the impurities are separated from the dissolved sorbic acid by centrifuging at the same temperature, and the sorbic acid is crystallized out in the known manner. Contrary to the known purification methods, according to the process of the present invention all oily and tarry impurities of raw sorbic acid, no matter whether they are specifically lighter or heavier than the sorbic acid solution, can be separated in a simple manner. This avoids a long period of contact between the sorbic acid solution and the impurities which are primarily hard or impossible to dissolve in water, which surprisingly prevents almost all discoloration of the sorbic acid solution and results in an improved quality of sorbic acid.

To avoid discoloration of the sorbic acid solution and secondary reactions of the impurities with water with formation of water-soluble impuritues it is useful to carry out the dissolving process at a temperature that is slightly below the boiling point of the water, e.g. 95 to 99° C, keeping a short staying time, e.g. of the order of 2 to 5 minutes. The staying time can be achieved by suitable measures, for instance thorough mixing during the dissolving process. By this one can practically eliminate the difficulties which arise due to the volatility of water vapor of sorbic acid and its tendency toward decomposing.

Moreover, it has been found suitable to prepare a saturated sorbic acid solution to increase the economy of the process by saving water. Here the necessary quantity of water is referred to the pure sorbic acid contained in the raw sorbic acid, whose content is determined, for instance, by esterifying the raw sorbic acid with diazomethane and determining the sorbic acid methyl ester in the esterified mixture by gas-chromatographic analysis.

Suitable for separation of the impurities according to our invention are all processing machines which by their principle of effectiveness can be considered as centrifuges, and more exactly high-speed full jacket centrifuges (see company article by Westfalia Separator AG, Oelde/West-phalia No. 3481/267, "The separation of liquid mixtures with the aid of separators", by H. Hemfort, Jr.).

The invention is described in connection with the accompanying drawing which is a diagrammatic illustration of an apparatus for carrying out the process.

As illustrated in the drawing, into the mixing boiler 1, which is equipped with an efficient stirrer 2 and a heating jacket, raw sorbic acid is piped continuously through the pipeline 3. At the same time water is piped into the boiler through pipeline 4, the water being circulated (mother liquor) and being heated to 98° C, in a quantity which is sufficient to obtain a solution of sorbic acid which is saturated at 98° C.

If necessary, concentrated caustic soda is piped in through line 5 to neutralize the hydrochloric acid contained in the raw sorbic acid in the form of diluted hydrochloric acid. The dwelling time of the components in the mixing boiler 1 is about 3 minutes at 98° C. During this period the raw sorbic acid is dissolved completely and one obtains an oily or tarry sorbic acid containing specifically lighter and specifically heavier by-products, which is carried through line 6 into a separator 7 for example, of the type Westfalia LG 205-3, which is heated to about 98° C,. While the by-products are continuously eliminated through line 8, the purified, specifically lighter sorbic acid solution is withdrawn through line 9 and it is carried to a crystallizing apparatus of any suitable known design. The resulting sorbic acid crystals are separated in the known manner, e.g. by a decanting centrifuge working continuously.

EXAMPLE

Into the mixing boiler 1 we pipe in through line 3,200 parts by weight per hour of raw sorbic acid. Besides 0.25 percent hydrogen chloride in the form of a 2.68 percent hydrochloric acid, the liquid contains 82.5 percent sorbic acid. At the same time we pipe in through line 5 1.1 parts by weight per hour of concentrated caustic soda, and through line 4 8,250 volume parts per hour of water (98° C) which contains 2.0 g/1 sorbic acid (circulation). Within about 2 minutes the raw sorbic acid is completely dissolved at 98° C under intensive mixing. The hot solution is continuously piped through line 6 into the separator 7 which is maintained at about 98° C. While the oily or tarry impurities are carried off continuously through line 8, we obtain through line 9 a clear, almost colorless sorbic acid solution which is cooled to 30° C. Thereby sorbic acid is separated in the form of white crystals, which are separated from the mother liquor and rinsed again with a little cold water. After drying in a vacuum at 45° C one obtains 161.0 parts by weight per hour of sorbic acid which besides 0.3 percent water contains practically no other impurities.

The yield amounts to 97.3 percent, referred to the 100 percent sorbic acid used in the form of raw sorbic acid.

The mother liquor contains 2.0 g/1 sorbic acid and can be used again for dissolving raw sorbic acid in circulation, or for processing.

The invention claimed is:

1. Process for continuously producing pure sorbic acid from raw sorbic acid obtained by hydrolysis or thermal cracking of polyesters obtained by reacting ketene with crotonaldehyde by crystallization from water, which comprises, forming a saturated aqueous solution of raw sorbic acid by dissolving sorbic acid in water at a temperature ranging from 95° to 99° C/760 torr over a period of 2 to 5 minutes, separating the impurities from the dissolved sorbic acid by centrifuging at the same said temperature, and crystallizing the pure sorbic acid.

* * * * *